United States Patent [19]

Morris et al.

[11] Patent Number: 4,941,398
[45] Date of Patent: Jul. 17, 1990

[54] OSCILLATING REED AND METHOD

[75] Inventors: Joseph W. Morris, Columbia; Thomas A. Melbourne, Laurel, both of Md.

[73] Assignee: Bowles Fluidics Corporation, Columbia, Md.

[21] Appl. No.: 270,041

[22] Filed: Jun. 3, 1981

[51] Int. Cl.$^5$ .......................... B60H 1/34; F24F 13/10
[52] U.S. Cl. ..........................: ............... 98/2; 98/2.09; 98/40.3; 239/102.1; 239/389
[58] Field of Search .......................... 84/350, 355, 359; 98/2.01, 2.04, 2.08, 2.09, 40 R, 40 H, 40 V; 137/826, 829, 831; 181/169, 224; 239/102, 380, 381, 382, 389

[56] References Cited

U.S. PATENT DOCUMENTS

| | | | |
|---|---|---|---|
| 3,687,369 | 8/1972 | Johnstone | 239/102 |
| 3,819,461 | 6/1974 | Jaffadi | 161/58 |
| 3,881,977 | 5/1975 | Daukjys | 156/242 |
| 4,022,585 | 5/1977 | Kaye | 428/551 |
| 4,061,806 | 12/1977 | Lindler et al. | 428/35 |
| 4,138,301 | 2/1979 | Van Auken et al. | 156/189 |
| 4,336,909 | 6/1982 | Stouffer | 98/2.08 X |

FOREIGN PATENT DOCUMENTS 24811  7/1978  Japan .................................. 181/169

Primary Examiner—Harold Joyce
Attorney, Agent, or Firm—Jim Zegeer

[57] ABSTRACT

There is disclosed improvements in oscillating reeds particularly for use in generating a sweeping or oscillating air flow pattern. The oscillating reeds of this invention are constituted by a plurality of spaced apart resilient reed elements which, preferably, are made from graphite fibers bonded together by an epoxy resin matrix reinforced by a scrim of fiber glass. To minimize the effect of torsion and/or forces which can cause the reed elements to buckle and hence create noise, a plurality of undulations are formed in the graphite strip. Thus, the oscillating reed according to the present invention offers the following four major advantages, (1) reduction in noise from buckling, (2) amplitude modulation, i.e. oscillation amplitude insensitivity to wide ranges of flow rates (3) easier starting of oscillation, and, (4) improved fatigue strength.

23 Claims, 1 Drawing Sheet

OSCILLATING REED AND METHOD

BACKGROUND OF THE INVENTION AND DESCRIPTION OF THE PRIOR ART

In Stouffer Pat. No. 4,250,799, (incorporated herein by reference) assigned to the assignee hereof, there is disclosed a sweeping air stream apparatus and method in which air flow under pressure through a channel to an outlet element is caused to issue to as a sweeping air stream pattern by a resilient vane or reed oscillator element having a free upstream end and a secured downstream end which is rendered oscillatable between a pair of extreme positions solely by air flow and, in Stouffer application Ser. No. 119,699 filed Feb. 8, 1980 entitled "Oscillating Reed and Method",(incorporated herein by reference), also assigned to the assignee hereof, the oscillator is disclosed as having a resilient vane or reed which incorporates means for limiting the bending thereof to an axis transverse to the direction of flow, said limiting means being constituted by one or more bends in the body of the resilient vane member to reduce the amount of noise produced. As there disclosed, the fluid air stream can and does at times distort the bending axis of the reed thereby creating a noise or clicking sound, such noise being very undesirable in air distribution systems and because of the distortion in the spring tending to reduce the life of the element when used as an oscillator. In addition, in his application Ser. No. 119,699 now U.S. Pat. No. 4,336,909, Stouffer suggested a series of transverse corrugations along the entire length of the body of the element to achieve the same objective as the general curvature or bend, as well as using a series of stiffner elements based along the entire operating length of the reed body. An alternative structure is disclosed in Stouffer International Application No. PCT/US80/00368 filed Apr. 9, 1980 and entitled "Sweeping Air Stream Apparatus and Method", (incorporated herein by reference), also assigned to the assignee hereof, wherein, in addition to the prior Stouffer disclosures referred to herein above, the resilient reed oscillator element comprised a pair of spaced apart elongated coil springs with an elastomeric sheet supported on the coil springs with the weight member being on one end of the pair of coil springs.

The above constitutes the best prior art and is referred to in compliance with 37 CFR §1.56, 1.97 and 1.98 and the duty of candor required by the Patent Laws of the United States. A text entitled "Technology of Carbon and Graphite Fiber Composites" by John Delmonte, Vans Nostrand and Reinhold Company, Copyright 1981 is also referred to for background information on carbon and graphite fiber composites as used in the preferred embodiment of the invention.

The present invention is an improvement over the above-identified Stouffer inventions in that there is amplitude modulation, i.e. the oscillation amplitude is insensitive to wide ranges of air flow rates, fatigue strength is improved and there is a reduction in noise from the buckling and the initiation of oscillation is easier.

According to the preferred embodiment of the present invention, graphite composite strips are assembled in spaced relation with the downstream ends secured in a mounting structure and the upstream ends secured to a common weight element. The graphite reeds are made from graphite fibers bound together by an epoxy resin matrix which can be reinforced by a scrim of fiber glass and a polyester resin. The graphite fibers are parallel to each other and perpendicular to the axis of bending so that the fibers are oriented to adequately resist the flexure bending (compression and tension). While it is within the contemplation of this invention that there be layers of fibers which are oriented to resist forces normal to the flexure and to the flexure axis, according to the preferred embodiment of the present invention, the torsion force or moment is resisted by the epoxy resin and by the glass scrim, if any. In the preferred embodiment, buckling due to these small torsional moments which cause noise is avoided by a plurality of undulations, the frequency of said undulations being sufficient to reduce the noise. The graphite fiber reinforced reed has greatly enhanced fatigue strength. In addition, the strip reed elements are not over driven when air velocity and flow rate are increased. Reed oscillation amplitude modulation is important because it solves the problem that the air flow in some cars for cold defroster operation is much greater than in hot defroster operation. A flat integral reed would start and operate in hot defrost and would twist and bang around violently in cold defrost operation. Thus by modulating the amplitude of oscillation by making the amplitude much less a function of air flow rate the strip reed elements construction is not over driven at higher air flow rates.

DESCRIPTION OF THE DRAWINGS

The above and other objects, advantages and features of the invention will become more apparent from the following specification when considered with the accompanying drawings wherein.

DETAILED DESCRIPTION OF THE INVENTION

Figure 1:
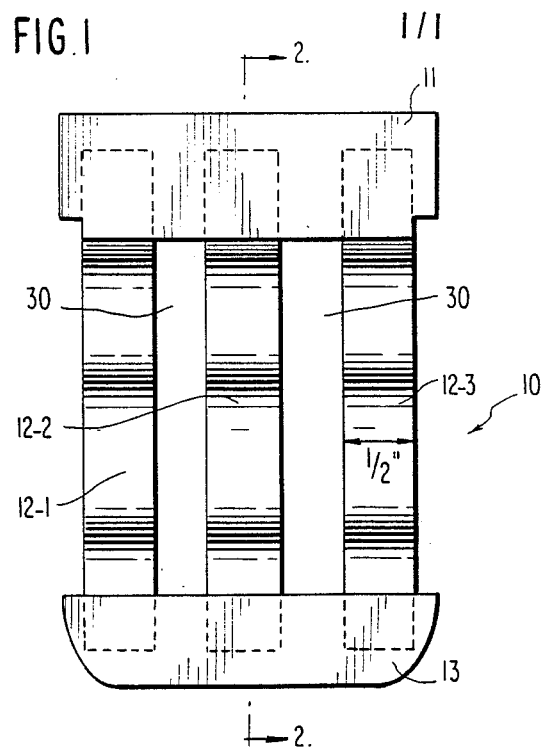
FIG. 1 is a top plan view of a reed oscillator element incorporating the invention.

The oscillating reed 10 of this invention includes a mounting bracket 11 secured to the downstream ends of a plurality of spaced resilient reed elements 12-1, 12-2 and 12-3 and a common weight member 13 secured to the upstream ends of resilient reed elements 12-1, 12-2 and 12-3.

Each of the elements 12-1, 12-2 and 12-3 (there may be more or less elements 12) has the upstream end secured preferably by adhesion, (either an adhesive or by sonic bonding, etc) to a common weight member which can be metallic but in the preferred form is plastic or non-metallic. The downstream ends of strips 12-1, 12-2 and 12-3 are secured, preferably by adhesion to mounting bracket 11, which also is non-metallic. In the preferred embodiment for use in hot and cold air (or gas) flow systems, such as the automobile defroster (where temperatures approach 170° to 180° F.) a high temperature plastic such as ABS is used to form mounting bracket 11 and common weight 13. It will be appreciated that these components may be molded on the respective ends of resilient strips 12-1, 12-2 and 12-3, or fastened with discrete fasteners. However, since the preferred material of which these strips are made is carbon or graphite fiber composite molded in a protective fiber glass scrim, frayed edges, cracks or other defects which may be caused by drilling or cutting should be avoided.

Since the oscillator may be mounted vertically (for automobile defrost operation, for example), and/or horizontally (for heater/air conditioning operation, for example), stiffness in the horizontal mode is desired, so at least for reeds that are mounted in the horizontal mode, there is about a one half inch width of the strips used to assure stiffness and avoidance of sagging.

Figure 2:
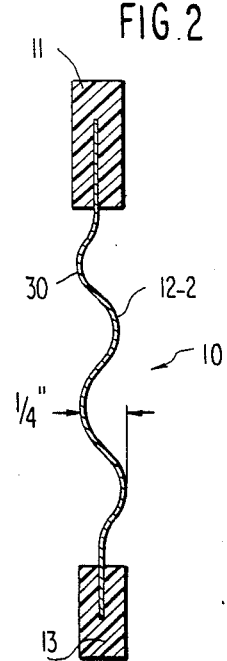
FIG. 2 is a side elevational view thereof and FIG. 3 is a partial isometric view of an air sweep outlet nozzle incorporating the invention

While strips 12 could be cut from larger sheets, the preferred way of fabricating them is by single layer "pre pregs" e.g. single layer of carbon or graphite fibers pre impregnated in an uncured resin matrix (which, in the disclosed embodiment, is a thermosetting epoxy resin but could be polyester resins) which is cured in a mold (See Demonte text for additional resins and fibers). A fiber glass scrim is also formed upon the exterior surfaces to protect the surface and add transverse stiffness. While specially oriented layers may be used to provide transverse stiffness, such stiffness is preferably provided by a plurality of undulations or sinusoids 30, molded into the strips, good results being achieved with a peak to peak amplitude of about $\frac{1}{4}$ inch with strips about $\frac{1}{2}$ inch wide. In this case the strips were about 2 $\frac{1}{4}$ inch long and the number of full cycles of undulations or sinusoids is about 2 (as shown) or more. In this case the graphite fiber layer was about 5 mils thick and the scrim was about 3 mils thick. The ends of the strips are straight so that common weight 13 and mounting bar 11 are in alignment as illustrated in FIG. 2. See the Demonte text for a list of pre preg manufacturers.

The slot openings or spaces 31, 32 between strips 12 are believed to be instrumental in limiting the amplitude of oscillation at high flow rates but the theoretical reasons for this is not fully understood at this time. The graphite composite strips are shown as separate members bound in spaced assembly by mounting bar 11 and weight 13 but it could be molded as a single entity with interconnects between strips. The open surface areas in the embodiment shown in FIG. 1 and has proven effective in limiting amplitude of oscillation in some automobile defrost systems where air flow for cold defroster operation is greater than in hot defroster operation.

Figure 3:
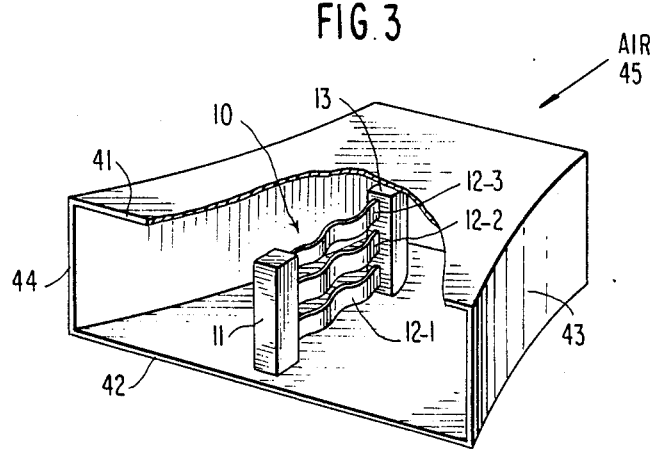

As shown in FIG. 3, the resilient reed 10 is secured in an outlet nozzle 40 having top wall 41 bottom wall 42 diverging sidewalls 43 and 44 and a source of air under pressure 45. Mounting bracket 11 is secured at its ends to top and bottom walls 41 and 42, respectively but many other ways of fixing the position of downstream ends of strips 12 will be readily apparent to those skilled in the art.

The use of fiber reinforced resilient strips 12-1, 12-2 and 12-3 has reduced the fatigue problem (tests thus far have successfully exceeded 5 million cycles of oscillation). Moreover, the reed oscillator begins oscillation easier and the amplitude modulated so that at high flow rates it is not overdriven. Finally, there has been a reduction in the noise due to buckling etc thereby resulting in overall improved performance.

While there has been disclosed and described the preferred embodiment of the invention, various modifications and improvements are possible and it is intended that such modifications and improvements that come within the spirit and scope of the invention be encompassed by the claims appended hereto.

What is claimed is:

1. In an air flow system having a source of air pressure flowing through a channel to an outlet means to issue as a sweeping air stream pattern, a resilient reed oscillator element having an upstream end and a downstream end, means securing said downstream end to said outlet means in fixed relation relative to said upstream end so that said upstream end is freely oscillatable, solely by air flow, between a pair of extreme positions, said extreme positions being spaced from the wall surfaces defining said outlet means and said channel and a weight member on said upstream end, the improvement wherein said resilient reed oscillator element is at least one thin strip member consisting of a single layer of elongated fibers bound in a resin matrix to improve the fatigue strength of said resilient reed oscillator element as compared to spring steel, all of said enlongated fibers being parallel to one another.

2. The invention defined in claim 1 wherein said elongated fibers are graphite.

3. The invention defined in claim 1 including a fiber glass and resin scrim on the exterior surfaces of said strip member.

4. The invention defined in claim 1 wherein said at least one strip member includes a plurality of noise reducing undulations molded in the surface thereof.

5. The invention defined in claim 1 wherein said at least one strip member has a plurality of noise reducing undulations in the surface thereof.

6. The invention defined in claim 5 wherein the said undulations approximate a sinusoid and have an amplitude of about $\frac{1}{4}$–$\frac{1}{2}$ inch peak to peak for a length of about 2.5".

7. The invention defined in claim 1 wherein said reed oscillator element is constituted by a plurality of graphite fiber strips secured in spaced relation by said means securing said downstream end to said outlet means and said weight member on said upstream end.

8. The invention defined in claim 7 wherein said weight member is non-metallic.

9. The invention defined in claim 8 wherein said weight member is adhesively secured to the upstream ends of said graphite strips.

10. The invention defined in claim 8 wherein said means securing said downstream end of said reed element includes a non-metallic member and the downstream ends of said graphite strips are adhesively secured thereto.

11. The invention defined in claim 10 wherein the resilient reed member includes a plurality of noise reducing undulations molded therein.

12. The invention defined in claim 1 wherein there is one or more elongated open spaces formed in said resilient reed oscillator element.

13. The invention as defined in claim 12 wherein there are at least two of said thin strips, means maintaining said thin strips in spaced apart relation to define said one or more elongated open spaces.

14. A resilient reed oscillator element which comprises a plurality of strips of fiber reinforced resin lamina, structural formations molded on the body of said strips constituting said resilient reed oscillator element to reduce noise during flexing thereof about a selected axis.

15. In an air operated resilient reed oscillator having an upstream end and a downstream end, mounting means fixedly mounting the downstream end of said resilient reed oscillator in an air stream, and a weight member secured to said upstream end of said resilient reed oscillator, the improvement wherein said resilient reed oscillator is constituted by a plurality of elongated strips having open spaces therebetween, said open spaces forming a plurality of apertures in said resilient reed for effectively limiting the amplitude of deflection of said upstream end of said resilient reed oscillator such that higher air flow velocities do not cause a proportionate increase in the amplitude deflection.

16. The invention defined in claim 15 wherein said strips are made from a single layer of parallel elongated fibers in a resin matrix.

17. The invention defined in claim 16 wherein said strips have a plurality of corresponding undulations moulded therein for reducing noise during the flexing thereof.

18. The invention defined in claim 17 wherein said weight member is secured to the downstream ends of said strips by adhesion.

19. In a gas powered resilient reed having a fixed downstream end and a weighted oscillatable upstream end, the improvement comprising means forming open spaces in the body of said resilient reed and wherein said resilient reed is constituted by a plurality of parallel graphite fibers in a resin matrix.

20. The invention defined in claim 19 wherein said plurality of parallel graphite fibers in a resin matrix are protected by a fiberglass and resin scrim.

21. In a gas powered resilient reed having a fixed downstream end and a weighted oscillatable upstream end, the improvement comprising means forming open spaces in the body of said resilient reed and wherein said resilient reed is composed of a plurality of separate molded strips of a fiber reinforced resin matrix.

22. The invention defined in claim 21 wherein said fiber is graphite.

23. The invention defined in claim 22 wherein said strips have a plurality of undulations molded therein to reduce noise on flexing thereof.

* * * * *